(12) United States Patent
Cleaver

(10) Patent No.: US 12,041,083 B1
(45) Date of Patent: *Jul. 16, 2024

(54) COORDINATING DISCRETE SYSTEMS

(71) Applicant: IDENTITY THEFT GUARD SOLUTIONS, INC., Portland, OR (US)

(72) Inventor: Brian Cleaver, Portland, OR (US)

(73) Assignee: IDENTITY THEFT GUARD SOLUTIONS, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,719

(22) Filed: Jan. 13, 2023

Related U.S. Application Data

(63) Continuation of application No. 16/903,697, filed on Jun. 17, 2020, now Pat. No. 11,588,853.

(51) Int. Cl.
  *H04L 29/06* (2006.01)
  *G06Q 20/12* (2012.01)
  *H04L 9/40* (2022.01)

(52) U.S. Cl.
  CPC ....... *H04L 63/1475* (2013.01); *G06Q 20/123* (2013.01); *H04L 63/1416* (2013.01)

(58) Field of Classification Search
  CPC ............ H04L 63/1475; H04L 63/1416; G06Q 20/123
  See application file for complete search history.

(56) References Cited

U.S. PATENT DOCUMENTS

| | | | |
|---|---|---|---|
| 6,741,687 B1* | 5/2004 | Coppage | H04M 17/00 455/406 |
| 9,270,835 B1* | 2/2016 | Velusamy | H04M 15/854 |
| 10,122,591 B1* | 11/2018 | Pack | H04L 63/101 |
| 10,699,028 B1* | 6/2020 | Kennedy | G06F 16/9535 |
| 11,140,171 B1* | 10/2021 | Friedman | H04L 9/0861 |
| 11,588,853 B1* | 2/2023 | Cleaver | G06Q 20/123 |

(Continued)

OTHER PUBLICATIONS

Kagal et al., "Authorization and privacy for semantic Web services", IEEE Intelligent Systems, vol. 19, Issue: 4, (Jul.-Aug. 2004).*

(Continued)

*Primary Examiner* — Morshed Mehedi
(74) *Attorney, Agent, or Firm* — Schwegman, Lundberg & Woessner, P.A.

(57) ABSTRACT

A provider of a first network-based service provides a list of user data for users of the first network-based service to a provider of a second network-based service. The users associated with the list of user data access results of the one or more identity monitoring services from the first network-based service, the second network-based service, a third-party identity monitoring service, or any suitable combination thereof. Additional services are offered to one or more users associated with the list of user data. A user accepting the offer pays a fee to the offering provider for the additional service. Based on the user being associated with the list of (Continued)

user data provided by the provider of the first network-based service and the user paying the fee for the additional service, a portion of the fee is transferred to the provider of the first network-based service.

20 Claims, 10 Drawing Sheets

(56) References Cited

U.S. PATENT DOCUMENTS

| | | | | |
|---|---|---|---|---|
| 2010/0156670 | A1* | 6/2010 | Hamilton, II | G08G 1/096741 340/928 |
| 2012/0197795 | A1* | 8/2012 | Campbell | G06Q 30/04 705/42 |
| 2014/0108121 | A1* | 4/2014 | Norton | G06Q 10/02 705/14.35 |
| 2014/0180872 | A1* | 6/2014 | Gura | G06Q 10/107 705/26.7 |
| 2014/0188725 | A1* | 7/2014 | Reardon | G06Q 20/40 705/44 |
| 2017/0221071 | A1* | 8/2017 | York | G06Q 10/063112 |
| 2017/0372391 | A1* | 12/2017 | Metnick | G06Q 30/018 |
| 2018/0121912 | A1* | 5/2018 | Morales | H04W 12/041 |
| 2019/0311109 | A1* | 10/2019 | D'Agostino | G06Q 20/321 |
| 2020/0143022 | A1* | 5/2020 | Frost | H04L 63/0869 |
| 2021/0201395 | A1* | 7/2021 | Kumar | G06Q 30/0609 |

OTHER PUBLICATIONS

U.S. Appl. No. 16/903,697, filed Jun. 17, 2020, Coordinating Discrete Systems.

"U.S. Appl. No. 16/903,697, Examiner Interview Summary mailed Oct. 19, 2022", 2 pgs.

"U.S. Appl. No. 16/903,697, Final Office Action mailed Aug. 19, 2022", 14 pgs.

"U.S. Appl. No. 16/903,697, Non Final Office Action mailed Apr. 8, 2022", 13 pgs.

"U.S. Appl. No. 16/903,697, Notice of Allowance mailed Nov. 3, 2022", 9 pgs.

"U.S. Appl. No. 16/903,697, Response filed Jun. 6, 2022 to Non Final Office Action mailed Apr. 8, 2022", 10 pgs.

"U.S. Appl. No. 16/903,697, Response filed Oct. 19, 2022 to Final Office Action mailed Aug. 19, 2022", 10 pgs.

Z, Li, et al., "Consortium Blockchain for Secure Energy Trading in Industrial Internet of Things", in IEEE Transactions on Industrial Informatics, vol. 14, No. 8; 3690-3700, (Aug. 2018), 11 pgs.

* cited by examiner

510 — USER TABLE

| USER ID | NAME | PARTNER |
|---|---|---|
| 1234 | ADAM SMITH | FACEMAG |
| 2345 | JOHN JAY | SLOWPOUND |
| 3456 | JAMES WILSON | YOURSPACE |

540 — STATUS TABLE

| USER ID | SERVICE 1 | SERVICE 2 | SERVICE 3 | SERVICE 4 |
|---|---|---|---|---|
| 1234 | ACTIVE | ACTIVE | INACTIVE | INACTIVE |
| 2345 | ACTIVE | INACTIVE | ACTIVE | INACTIVE |
| 3456 | ACTIVE | INACTIVE | INACTIVE | ACTIVE |

*FIG. 5*

COORDINATING DISCRETE SYSTEMS

PRIORITY APPLICATIONS

This application is a continuation of U.S. patent application Ser. No. 16/903,697, filed Jun. 17, 2020, the content of which is incorporated herein by reference in its entirety.

TECHNICAL FIELD

The subject matter disclosed herein generally relates to coordinating discrete systems. Specifically, in some example embodiments, the present disclosure addresses systems and methods for coordinating multiple service provider systems via a network.

BRIEF DESCRIPTION OF THE DRAWINGS

Some embodiments are illustrated by way of example and not limitation in the figures of the accompanying drawings.

FIG. 5 is a block diagram illustrating a database schema suitable for supporting coordinating discrete systems, according to some example embodiments.

DETAILED DESCRIPTION

Example methods and systems are directed to coordinating discrete systems. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A provider of a first network-based service (e.g., a social media service, a financial service, a retail service, or any suitable combination thereof) provides a list of user data for users of the first network-based service to a provider of a second network-based service (e.g., a security brokering service). The provider of the second network-based service provides the list of user data to a third-party identity monitoring service, which provides one or more identity monitoring services related to the list of user data. The users associated with the list of user data access results of the one or more identity monitoring services from the first network-based service, the second network-based service, the third-party identity monitoring service, or any suitable combination thereof. In some example embodiments, the one or more identity monitoring services are provided without charge to the users, the provider of the first network-based service, or both.

Additional services (e.g., additional security services) are offered to one or more users associated with the list of user data by the provider of the second network-based service, the provider of the third-party identity monitoring service, or both. Example security services include dark web scanning, identity protection, and credit monitoring. A user accepting the offer pays a fee (e.g., a one-time fee, a recurring fee, or both) to the offering provider for the additional service. Based on the user being associated with the list of user data provided by the provider of the first network-based service and the user paying the fee for the additional service, a portion of the fee is transferred to the provider of the first network-based service.

Figure 1:
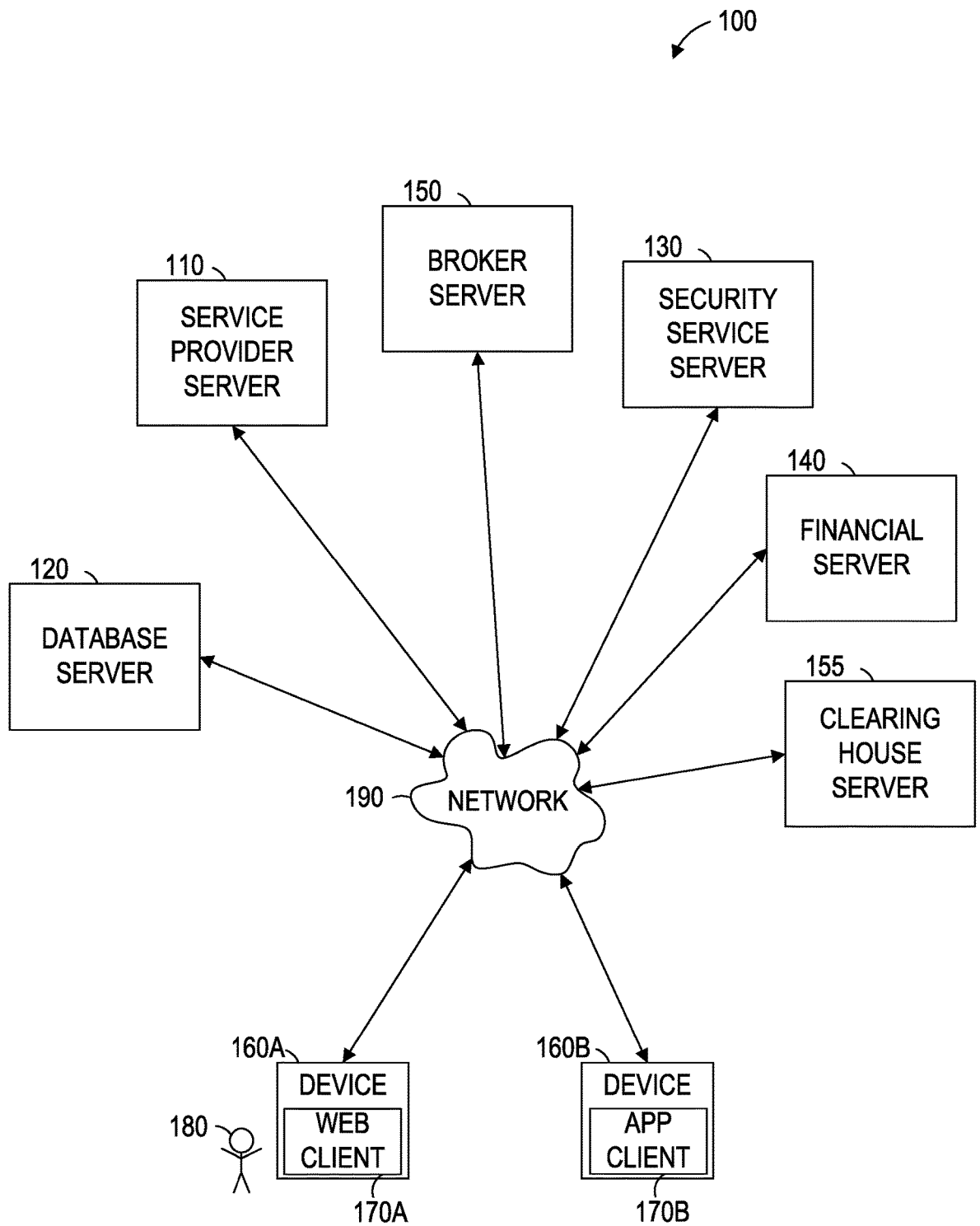
FIG. 1 is a network diagram illustrating a network environment suitable for coordinating discrete systems, according to some example embodiments.

FIG. 1 is a network diagram illustrating a network environment 100 suitable for coordinating discrete systems, according to some example embodiments. The network environment 100 includes a service provider server 110, a database server 120, a security service server 130, a financial server 140, a broker server 150, a clearing house server 155, and devices 160A and 160B, all communicatively coupled to each other via a network 190. The devices 160A and 160B may be collectively referred to as "devices 160," or generically referred to as a "device 160." The service provider server 110, database server 120, security service server 130, financial server 140, broker server 150, and clearing house server 155 are network-based systems. The devices 160 may interact with the servers 110-155 using a web client 170A or an app client 170B. The servers 110-155 and the devices 160 may each be implemented in a computer system, in whole or in part, as described below with respect to FIGS. 9-10.

The service provider server 110 provides a service (e.g., a social media service) to users via the network 190. As part of providing this service, the service provider server 110 collects user account data for each user. As used herein, user account data refers to any data of the user account. Example user account data includes, but is not limited to, name (e.g., first name, last name, middle name, or username), password, address (e.g., email address, physical address, or phone number), or physical characteristics (e.g., age, height, weight, or gender). Though a social media service is used by way of example, other types of network-based services that collect user account data may be provided in place of the social media service of the service provider server 110.

Database services are provided by the database server 120 to one or more of the service provider server 110, the security service server 130, the financial server 140, and the broker server 150. In some example embodiments, distinct database servers are used by each of the servers 110, 130, 140, 150, and 155. The database services provided by the database server 120 include data storage and retrieval.

The security service server 130 provides one or more security services (e.g., dark web scanning, monitoring services, privacy protection services, health claims monitoring, or any suitable combination thereof). Dark web scanning determines if user account data is available on the dark web, indicating that a user account has been compromised. Monitoring services include credit monitoring, credit lock, and social security number scanning. Privacy protection services scan social networks to detect fraudulent and takeover activity, identify inappropriate content, and reduce personal information exposure. Health claims monitoring provides an alert to a user whenever a medical claim is made against their identity.

Financial services are provided by the financial server 140 via the network 190 to the users of the devices 160; the service providers associated with the service provider server 110, the database server 120, the security service server 130, the broker server 150; or any suitable combination thereof. In some example embodiments, the security service server 130 provides security services to the users of the devices 160 and the financial server 140 transfers fees for security services from user accounts to an account of the security service provider, an account to the broker, or any suitable combination thereof. The financial server 140 may also transfer a portion of the fee from an account of the security service provider or an account of the broker to an account of the service provider.

The broker server 150 provides broker services to the service provider, security service provider, end users, or any suitable combination thereof. The service provider may provide account data to the broker (e.g., by transmitting the account data from the service provider server 110 to the broker server 150 via the network 190). The broker selects from among multiple security service providers and, after selecting one, sends the account data to the security service server 130 associated with the selected security service provider. Fees for the security service may be shared among the broker, the security service provider, and the service provider that originated the account data.

The clearing house server 155 collects data regarding transactions via the network 190. Many different insurance companies use unique protocols for requesting and providing authorization, receiving payment, and providing services. Thus, medical service providers face high overhead in interacting with multiple insurance companies. To alleviate this, a clearing house provides a single interface to users and handles the complexity of dealing with the multiple insurance companies. Intentionally or as a side effect of performing this intermediary function, the clearing house acquires information about the medical services being provided to medical consumers across multiple medical service providers and insurance companies.

Also shown in FIG. 1 is a user 180. The user 180 may be a human user (e.g., a human being), a machine user (e.g., a computer configured by a software program to interact with the devices 160 and one or more of the servers 110-155), or any suitable combination thereof (e.g., a human assisted by a machine or a machine supervised by a human). The user 180 is not part of the network environment 100, but is associated with the devices 160 and may be a user of the devices 160 (e.g., an owner of the devices 160A or 160B). For example, the device 160 may be a desktop computer, a vehicle computer, a tablet computer, a navigational device, a portable media device, or a smart phone belonging to the user 180.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 9-10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 190 may be any network that enables communication between or among machines, databases, and devices (e.g., the security service server 130 and the devices 160). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
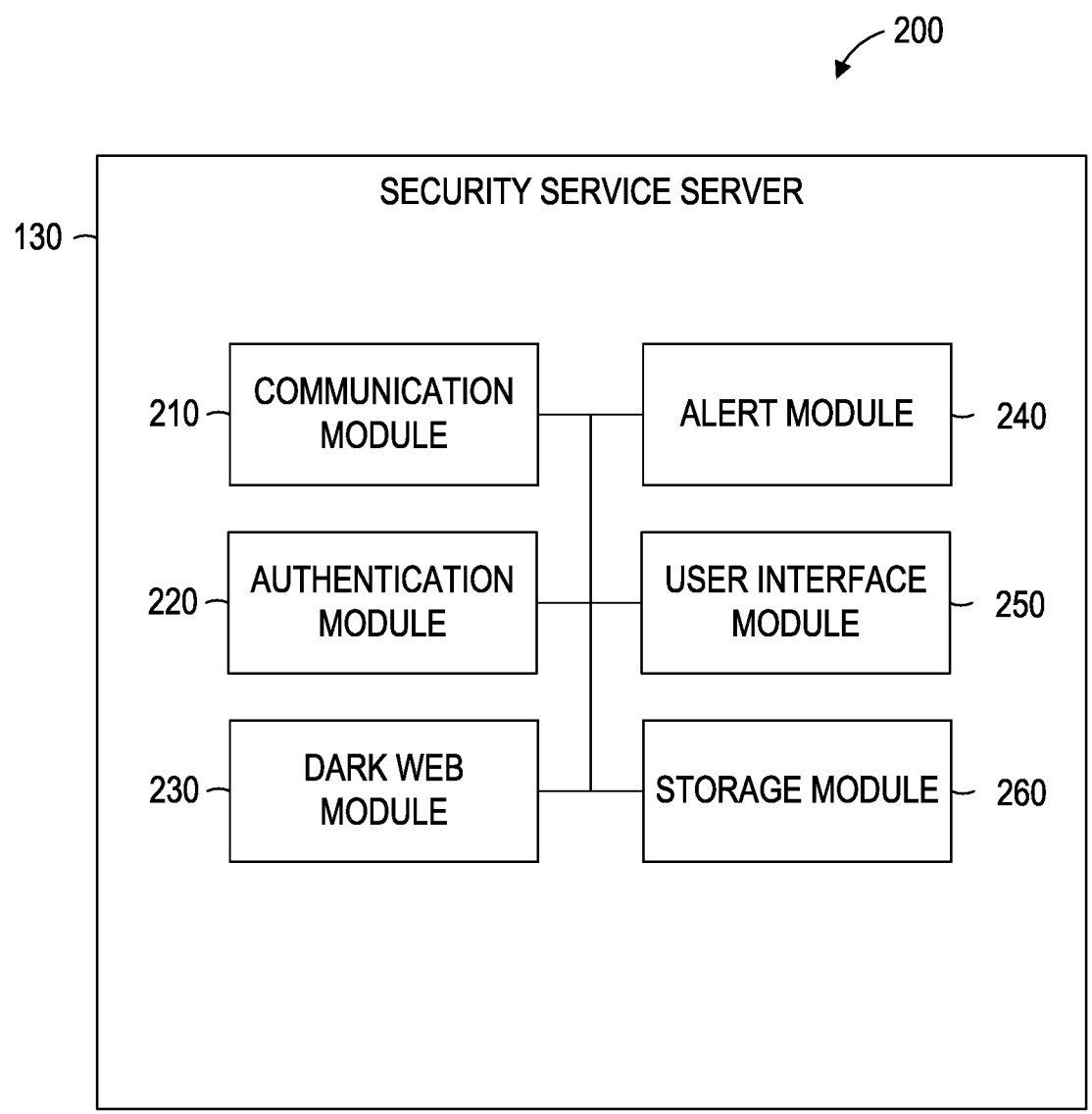
FIG. 2 is an architectural diagram illustrating components of a security service server in communication with other systems, according to some example embodiments.

FIG. 2 is an architectural diagram 200 illustrating components of a security service server 130 in communication with other systems, according to some example embodiments. The security service server 130 includes a communication module 210, an authentication module 220, a dark web module 230, an alert module 240, a user interface module 250, and a storage module 260, all configured to communicate with each other (e.g., via a bus, shared memory, a switch, or APIs). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive, over the network 190, a request for a user interface for providing security information to a device 160. The communication module 210 may provide the request to the user interface module 250, transmit a user interface provided by the user interface module 250 to the device 160, and receive user selections of options in the user interface for processing by the authentication module 220, the dark web module 230, or the alert module 240; storage by the storage module 260; or any suitable combination thereof.

The authentication module 220 is configured to authenticate a user. For example, a question that only the user is expected to know the answer to may be presented to the user and the user authenticated only if the response is correct. In some example embodiments, multiple such questions are presented and the responses evaluated. The user may be permitted to proceed to view security status information, lock access to data, unlock access to data, subscribe to additional security services, or any suitable combination thereof, only after authentication is successful.

The dark web module 230 is configured to search the dark web for user account data and report, via the user interface module 250, the results of the search. For example, the dark web may be searched for a user's username, password, real name, or other identifying information. Results of the search may be received and used to update a user interface provided by the user interface module 250, used to cause an alert to be generated by the alert module 240, stored for later reference by the storage module 260, or any suitable combination thereof.

The alert module 240 is configured to generate alerts. The generated alerts may be provided to users (e.g., to report data access status changes, such as credit status changes, to report data breaches, to report suspected identity theft, or any suitable combination thereof) or to administrators (e.g., to report error conditions in communications with one or more database servers). Each alert may be in the form of e-mail, text message, automated voice message, or another suitable method of notification.

The user interface module 250 serves a web site, via a hypertext transfer protocol (HTTP) connection, to the device 160A. The security service server 130 is in communication, via a representational state transfer (REST) application programming interface (API), with one or more of the servers 110, 120, and 140. The user interface may include information regarding a user's current security status, provide options to add or cancel security services, or any suitable combination thereof. For example, one or more of the user interfaces 300 and 400, described below with respect to FIGS. 3-4, may be presented by the user interface module 250, and selections may be received via an application interface or a web interface. Additionally or alternatively, the user interface module 250 may provide a user interface to authenticate the user. The storage module 260 is configured to store data regarding users, entities, data access status, or any suitable combination thereof.

In some example embodiments, the database server 120 or the security service server 130 uses Structured Query Language (SQL) to access standard relational database and NoSQL to access databases other than standard relational databases. Dynamo NoSQL is a particular type of NoSQL based on key-value pairs. For example, a database may store usernames, passwords, authentication questions, user profiles, a user's name, social security number, birthdate, address, previous addresses, phone number, bank account numbers, or any suitable combination thereof.

Figure 3:
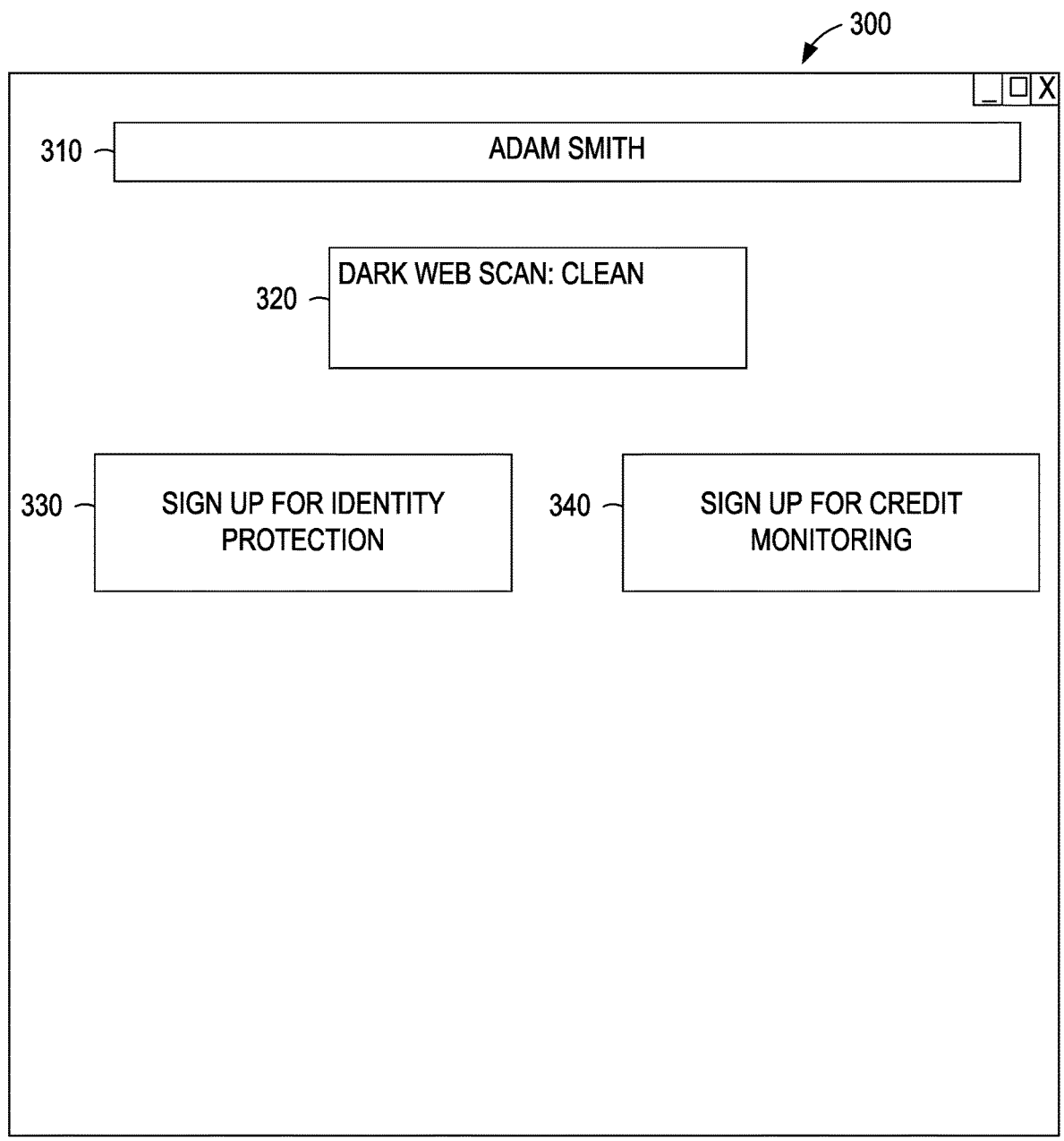
FIG. 3 is a block diagram illustrating a user interface for reporting identity monitoring results and offering additional services, according to some example embodiments.

FIG. 3 is a block diagram illustrating a user interface 300 for reporting identity monitoring results and offering additional services, according to some example embodiments. As can be seen in FIG. 3, the user interface 300 includes a name 310, a status area 320, and buttons 330 and 340. In some example embodiments, the user interface 300 is provided by the security service server 130 for users identified in a list of user data provided by the service provider server 110. In alternative example embodiments, the broker server 150 requests data for populating the user interface 300 from the security service server 130 and provides the user interface 300 to the user device.

The user interface 300 may be displayed in response to a user requesting a security status. The name 310 indicates a name of the user. The status area 320 shows the status of a security service for the user. In the example of FIG. 3, the status area 320 shows that the dark web scan for the user was clean. The buttons 330 and 340 are each operable to cause the security service server 130 to sign up the user for an additional security service for the user. By way of example, the button 330 is operable to sign up the user for identity protection and the button 340 is operable to sign up the user for credit monitoring.

Figure 4:
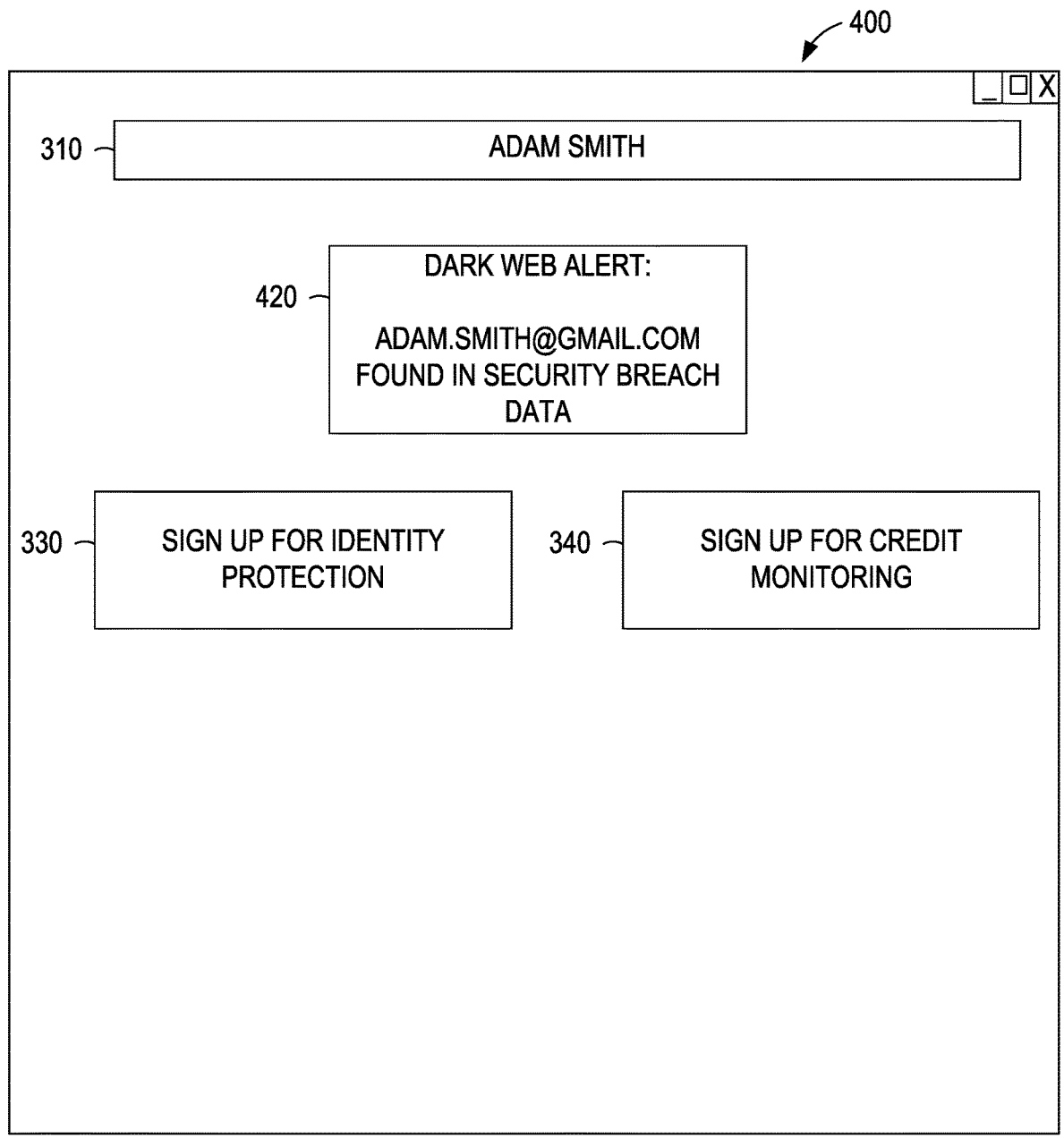
FIG. 4 is a block diagram illustrating a user interface for reporting identity monitoring results and offering additional services, according to some example embodiments.

FIG. 4 is a block diagram illustrating a user interface 400 for reporting identity monitoring results and offering additional services, according to some example embodiments. As can be seen in FIG. 4, the user interface 400 includes the name 310, a status area 420, and the buttons 330 and 340. The name 310, the button 330, and the button 340 are described above with respect to FIG. 3.

The user interface 400 may be displayed in response to a user requesting a security status. The user interface 400 is provided by the security service server 130 for users identified in a list of user data provided by the service provider server 110. The status area 420 shows the status of a security service for the user. In the example of FIG. 4, the status area 420 shows that the dark web scan for the user determined that an email address associated with the user was discovered in security breach data on the dark web.

FIG. 5 is a block diagram illustrating a database schema 500 suitable for supporting coordinating discrete systems, according to some example embodiments. The database schema 500 includes a user table 510 and a status table 540. The user table 510 is defined by a table definition 520, including a user identifier field, a name field, and a partner field, and includes rows 530A, 530B, and 530C. The status table 540 is defined by a table definition 550, including a user identifier field and four service status fields, and includes rows 560A, 560B, and 560C.

Each of the rows 530A-530C stores information for a user. The user identifier field stores a unique identifier for the user. The name field stores a name of the user. The partner field stores an identifier of the partner service provider that provided user data for the user and to which a portion of fees collected from the user is remitted. In various example embodiments, additional or different fields are stored in the user table 510. For example, an address field, a birthdate field, a phone number field, or any suitable combination thereof may be stored.

Each of the rows 560A-560C stores the data access status of a user with an entity. The row 560A shows that the user with identifier 1234, "Adam Smith" of the user table 510, has activated services one and two while services three and four are inactive. According to the row 560B, the user with identifier 2345, "John Jay," has services one and three active and services two and four inactive. The user with identifier 3456, "James Wilson," as shown in the row 560C, has services one and four active and the remaining services inactive.

Data from the user table 510 may be used in performing security services. For example, user data such as name, username, password, phone number, street address, and the like may be stored in the user table 510 and used for a dark web scan. Data from the status table 540 may be used in determining which security services to perform and to provide results for (e.g., in the user interface 300 or 400). For example, "service 1" may correspond to a dark web scan, "service 2" to an identity monitoring service, "service 3" to a medical services monitoring service, and "service 4" to a credit monitoring service.

Figure 6:
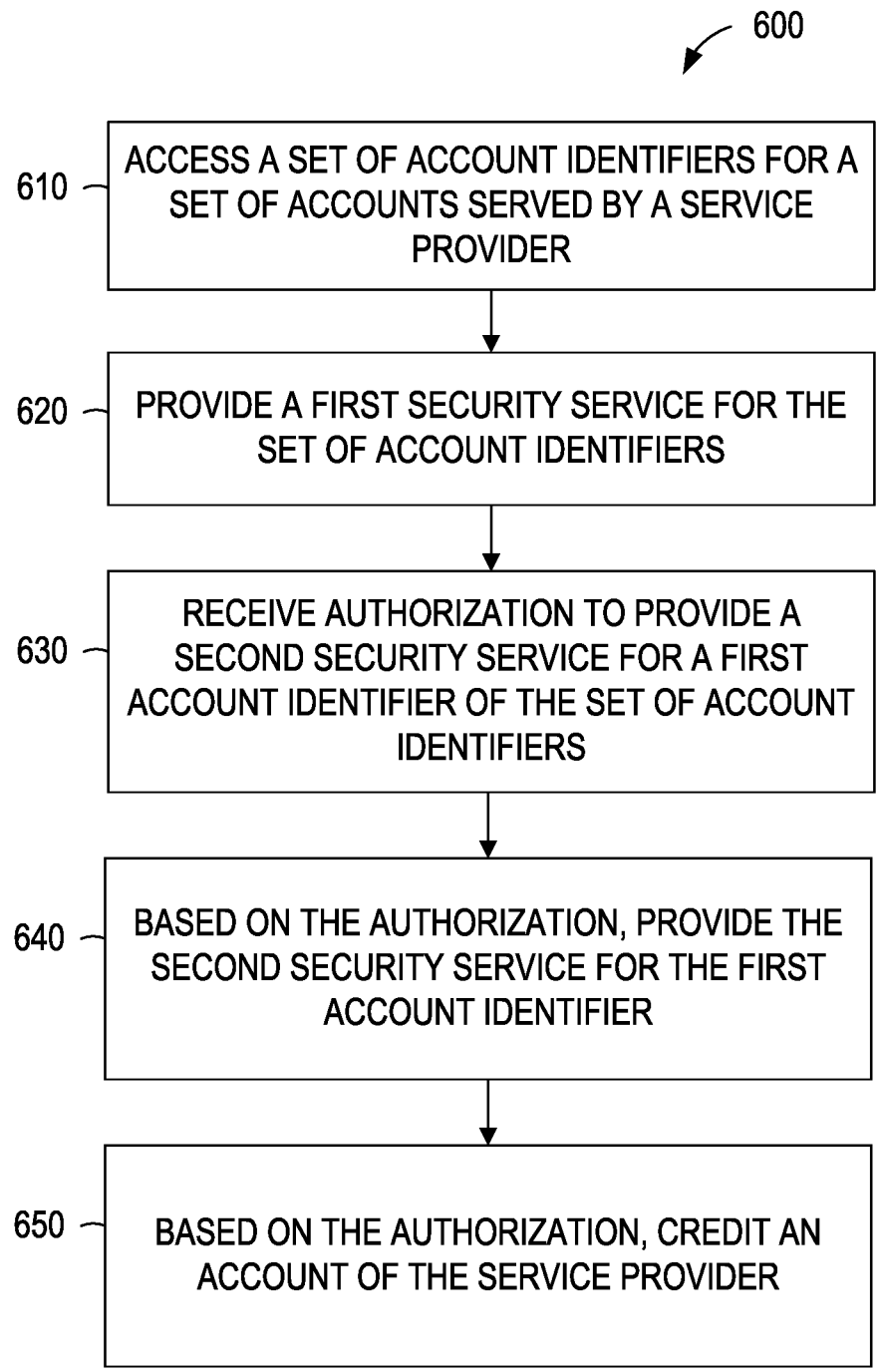
FIG. 6 is a flowchart illustrating operations of a computing device in performing a method of coordinating discrete systems, according to some example embodiments.

FIG. 6 is a flowchart illustrating operations of a computing device in performing a method 600 of coordinating discrete systems, according to some example embodiments. By way of example and not limitation, operations in the method 600 are described as being performed by the security service server 130 and the broker server 150, using modules described above with respect to FIG. 2.

In operation 610, the security service server 130 accesses a set of account identifiers for a set of accounts serviced by a service provider. For example, the service provider server 110 may use an application programming interface (API) of the security service server 130 to provide, to the security service server 130, a set of account data for accounts of the service provided by the service provider server 110. The account data may include user name, name, email address, social security number, another identifier, or any suitable combination thereof. As another example, the set of account identifiers may be stored, by the service provider server 110, in a database of the database server 120 and accessed by the security service server 130 at a later time. As yet another example, the set of account identifiers may be provided by the service provider server 110 to the broker server 150 and from the broker server 150 to the security service server 130.

The security service server 130, in operation 620, provides a first security service for the set of account identifiers. For example, the dark web module 230 may be used to search the dark web for instances of the account identifiers in data repositories containing compromised account data. In some example embodiments, the first security service is provided periodically for each account identifier in the set of account identifiers. For example, a dark web scan may be performed daily or weekly.

In operation 630, the security service server 130 receives authorization to provide a second security service for a first account identifier of the set of account identifiers. For example, an input may be received via the user interface 300 indicating that a user requests identity protection or credit monitoring services. The user interface 300 may be presented by the security service server 130 or the broker server 150.

Based on the authorization received in operation 630, the security service server 130, in operation 640, provides the second security service for the first account identifier. For example, a credit monitoring service may be provided in conjunction with one or more credit reporting agencies. The credit monitoring service may be provided for a fee to the user that authorized the second security service (e.g., via credit card payment).

In operation 650, the security service server 130 or the broker server 150, based on the authorization received in operation 630, credits an account of the service provider that provided the set of account identifiers in operation 610. For example, 10% of the fee received from the user may be transferred from an account of the security service provider associated with the security service server 130 to an account of the service associated with the service provider server 110. The transfer may be accomplished using services provided by the financial server 140. An additional funds transfer may be made between an account of the recipient of the user's funds (e.g., the broker or the security service provider) to an account of the other party (e.g., the security service provider or the broker). In this way, the fee for the security service is shared among the broker, the security service provider, and the service provider that originated the user data.

Figure 7:
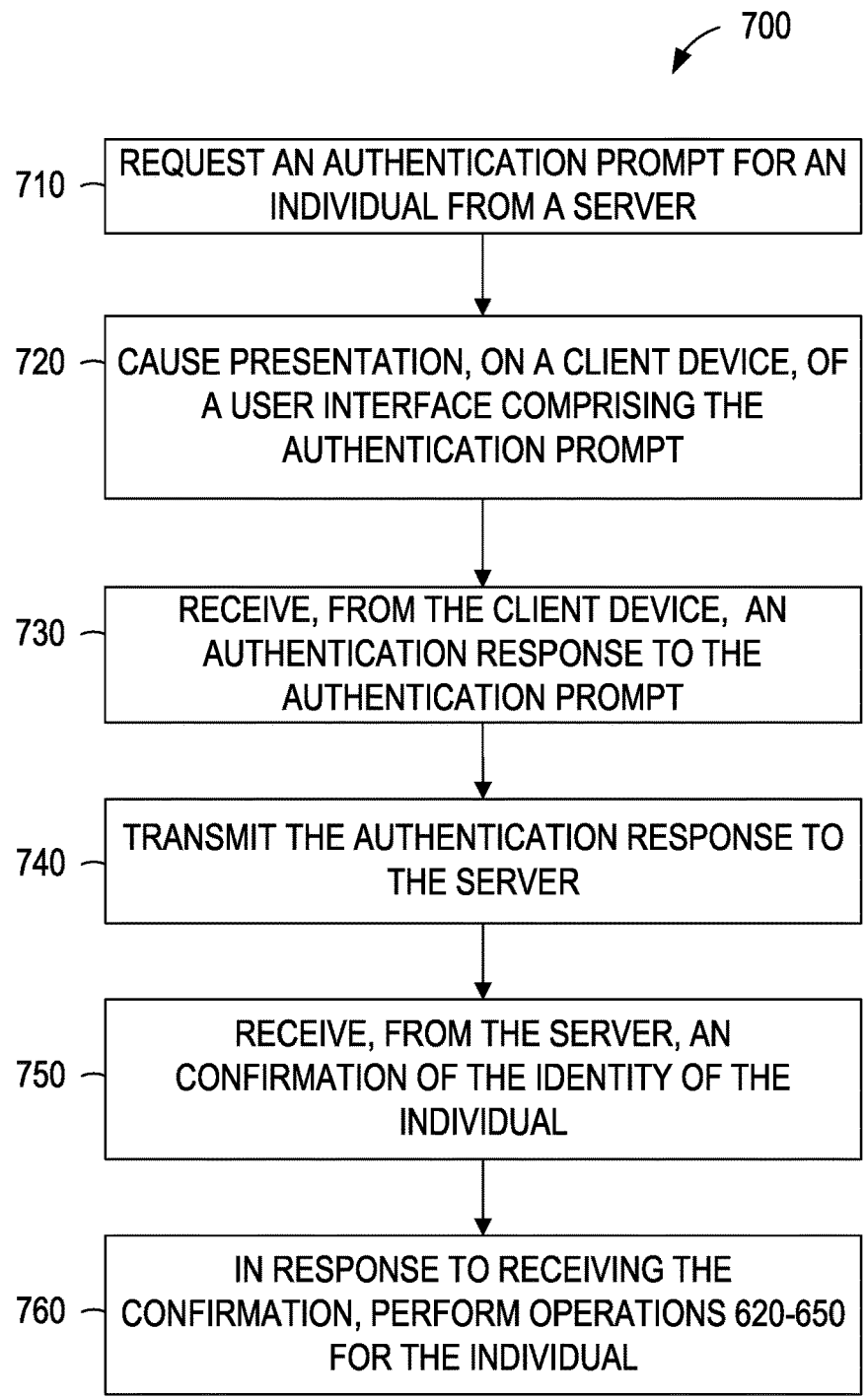
FIG. 7 is a flowchart illustrating operations of a computing device in performing a method of coordinating discrete systems, according to some example embodiments.

FIG. 7 is a flowchart illustrating operations of a computing device in performing a method 700 of coordinating discrete systems, according to some example embodiments. By way of example and not limitation, operations in the method 700 are described as being performed by the security service server 130 and the broker server 150, using modules described above with respect to FIG. 2.

In operation 710, the authentication module 220 of the security service server 130 or the broker server 150 requests an authentication prompt for an individual from a server (e.g., the clearing house server 155). For example, a server of a credit monitoring service or a medical clearing house may be requested provide the authentication prompt. The authentication prompt may comprise one or more true facts about the individual and one or more false statements about the individual. Example facts and statements include details regarding a transaction (e.g., date, address, amount, or any suitable combination thereof), physical details regarding the individual (e.g., age, height, weight, gender, or any suitable combination thereof), or contact information about the individual (e.g., residential address, telephone number, email address, work address, employer name, or any suitable combination thereof).

The user interface module 250 of the broker server 150 or the security service server 130, in operation 720, causes presentation on a client device (e.g., the device 160A) of a user interface comprising the authentication prompt. For example, the user may be requested to identify which of the facts and statements are true and which are false.

In operation 730, the user interface module 250 receives, from the client device, an authentication response to the authentication prompt. In some example embodiments, the authentication response identifies one or more of the facts or statements as being true or false. In other example embodiments, the authentication prompt and response comprise another form of two-factor authentication, such as a text message and response, an email message and response, or a communication via an app running on a mobile device of the individual.

The security service server 130 or the broker server 150, in operation 740, transmits the authentication response to the server (e.g., the clearing house server 155). Thus, by performance of the operations 710-740, the server is enabled to determine if the user providing the authentication response in operation 730 is the individual for which the authentication prompt was generated in operation 710.

In operation 750, based on the authentication being successful, the security service server 130 or the broker server 150 receives, from the server (e.g., the clearing house server 155), a confirmation of the identity of the individual. If the broker server 150 is intermediating the communications with the security service server 130, the broker server 150 receives the confirmation from the server and sends the confirmation to the security service server 130. In response to receiving the confirmation, the security service server 130 performs operations 620-650 for the individual (operation 760). The method 700 is performed for each individual associated with an account of the set of accounts of operation 610. Thus, by use of the method 700, the first security service of operation 620 is performed only for individuals that authenticate themselves with the security service server 130.

Figure 8:
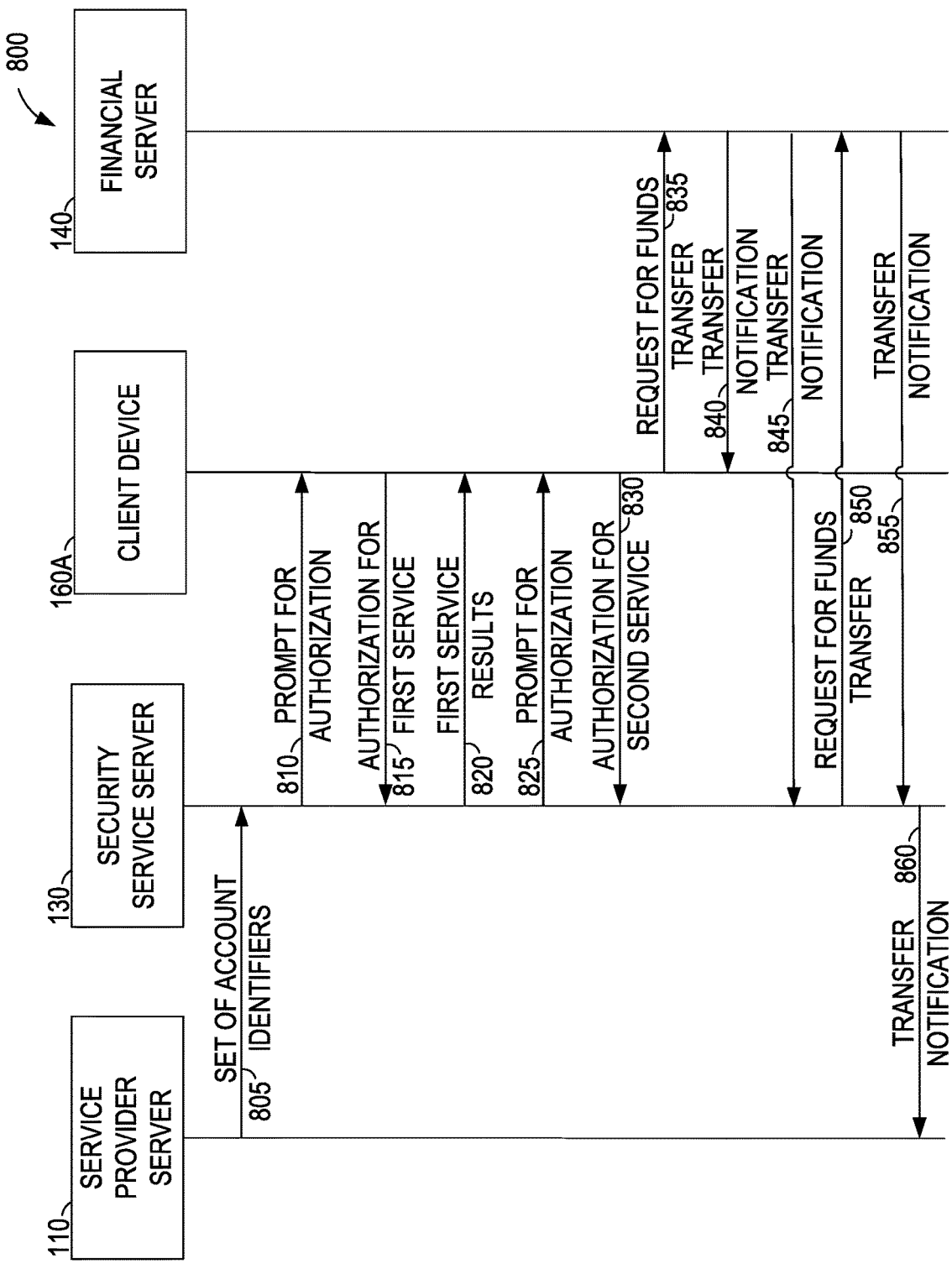
FIG. 8 is a swim-lane diagram illustrating communications between computer systems in performing a method of coordinating discrete systems, according to some example embodiments.

FIG. 8 is a swim-lane diagram 800 illustrating communications between computer systems in performing a method of coordinating discrete systems, according to some example embodiments. The swim-lane diagram 800 shows communications 805, 810, 815, 820, 825, 830, 835, 840, 845, 850, 855, and 860 among the service provider server 110, the security service server 130, the client device 160A, and the financial server 140. In some example embodiments, the communications 805-860 are performed sequentially.

The service provider server 110, in communication 805, provides a set of account identifiers (e.g., usernames, passwords, social security numbers, or any suitable combination thereof) to the security service server 130. For each account identifier, the security service server 130 sends a prompt for authorization (communication 810) to the client device associated with the account identifier (e.g., the client device 160A). In some example embodiments, the set of account identifiers includes, for each account identifier, an identifier for a client device (e.g., a phone number to which text messages can be sent). In these example embodiments, communication 810 is sent to the identified client device. In other example embodiments, users are provided a means to access the security service server 130 to receive the prompt for authorization. For example, the service provider server 110 may provide a uniform resource locator (URL) to its users and, by accessing the URL, the prompt for authorization is received and presented.

In some example embodiments, the service provider server 110 periodically sends communication 805. The first communication 805 may include a complete set of account identifiers while later communications 805 may include only updates to the set of account identifiers. Thus, the security service server 130 is kept up-to-date as to the current set of account identifiers, without consuming excess bandwidth resending the same data.

The client device 160A presents the prompt for authorization to a user and receives the authorization from the user. Thereafter, the client device 160, in communication 815, sends the authorization for a first security service to the security service server 130. For example, the user may consent to having the security service server 130 perform a dark web search for the account identifiers of the user.

In response to receiving the authorization for the first service, the security service server 130 performs (or causes another server to perform) the authorized first service. The results of the first service are transmitted, in communication 820, to the client device 160A for presentation to the user. For example, the user interface 300 or 400 may be presented to display the results of a dark web search (in status area 320 or 420). In some example embodiments, a fee for the first service is waived.

In communication 825, the security service server 130 sends a prompt for authorization for a second security service to the client device 160A. For example, the buttons 330 or 340 of FIGS. 3-4 may be presented. As another example, a text message may be sent to a mobile device of the user, requesting a particular response for authorization.

The client device 160A transmits, in communication 830, an authorization for the second security service to the security service server 130. For example, the user may click on or press the button 330 to request an identity protection service, causing a web browser of the client device 160A to transmit a request (using hypertext transport protocol (HTTP)) to the security service server 130.

Before preforming the second service, the security service server 130 requests a transfer of funds from the client device 160A and, in communication 835, the client device 160A requests the funds transfer via the financial server 140. For example, the financial server 140 may transfer funds from a credit card account, checking account, bitcoin wallet, PayPal™ account, or other account of the user to an account of the security service provider.

The financial server 140 performs the requested funds transfer and notifies, in communications 840 and 845, the client device 160A and the security service server 130. After the funds are transferred, the security service server 130 performs the second security service and communicates the second service results to the client device 160A.

In some example embodiments, the security service server 130 initiates the request for funds transfer instead of the client device 160A. In these example embodiments, the security service server 130 may provide a user interface to the client device 160A that allows a user to enter information for the financial account from which the funds will be transferred. The financial information is communicated from the client device 160A to the security service server 130, which transmits the request for funds transfer to the financial server 140. The financial information for the user may be stored by the security service server 130 and re-used when an additional service is authorized by the user.

In response to receiving the funds from the user and based on the account identifiers having been received from the service provider server 110, the security service server 130, in communication 850, requests the financial server 140 to transfer funds from the account of the security service provider to an account of the service provider. The amount of the transfer may be a percentage of the amount transferred from the user account to the account of the security service provider.

After performing the requested transfer of funds, the financial server 140 provides, in communications 855 and 860, transfer notifications to the security service server 130 and the service provider server 110. In this way, the service provider receives remuneration from the security service provider when users of the service provider pay for additional services of the security service provider. Additionally, the users of the service provider are enabled to receive a first security service without charge. As a result, security of the users of the service provider is enhanced without charge to either the service provider or the users.

In some example embodiments, the service provider is charged a fee by the security service for the first security service. In these example embodiments, transfer of the fee may be delayed and the portions of user fees that would be transferred to the account of the service provider credited against the balance of the fee. As a result, the fee may be completely offset by sufficient use of the second security service.

The swim-lane diagram 800 does not show the broker server 150, but intermediation by the broker server 150 in the communications between the service provider server 110 and the security service server 130, between the security service server 130 and the client device 160A, or both, is contemplated. Thus, communication 805 may be replaced by a first communication from the service provider server 110 to the broker server 150, containing the set of account identifiers, and a second communication from the broker server 150 to the security service server 130, also containing the account identifiers. In some example embodiments, the broker server 150 transforms the data from a first format to a second format. When multiple security services are available to the broker, each security service may use a different format and the broker server 150 may transform the data in accordance with the predetermined data format of the receiving security service server 130.

Intermediation by the broker server 150 may also result in the splitting of communications 810, 815, 820, 825, 830, and 860 into two communications. Furthermore, the request for funds transfer 850 may originate from the broker server 150 instead of the security service server 130, resulting in a funds transfer from the broker to the service provider. An additional funds transfer request may be made, to transfer funds from the broker to the security service. Thus, the broker receives a fee for the second service from the user, transfers a first portion to the security service provider, transfers a second portion to the service provider, and retains the remainder.

According to various example embodiments, one or more of the methodologies described herein may facilitate efficient provision of a first security service to a set of accounts as an additional service to users of a first service provider (e.g., a social media service). Additionally, one or more of the methodologies described herein may facilitate revenue sharing between the security service provider and the first service provider.

When these effects are considered in aggregate, one or more of the methodologies described herein may obviate a need for certain efforts or resources that otherwise would be involved in providing, receiving, or billing for multiple security services. Efforts expended by a user in receiving security services may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 9:
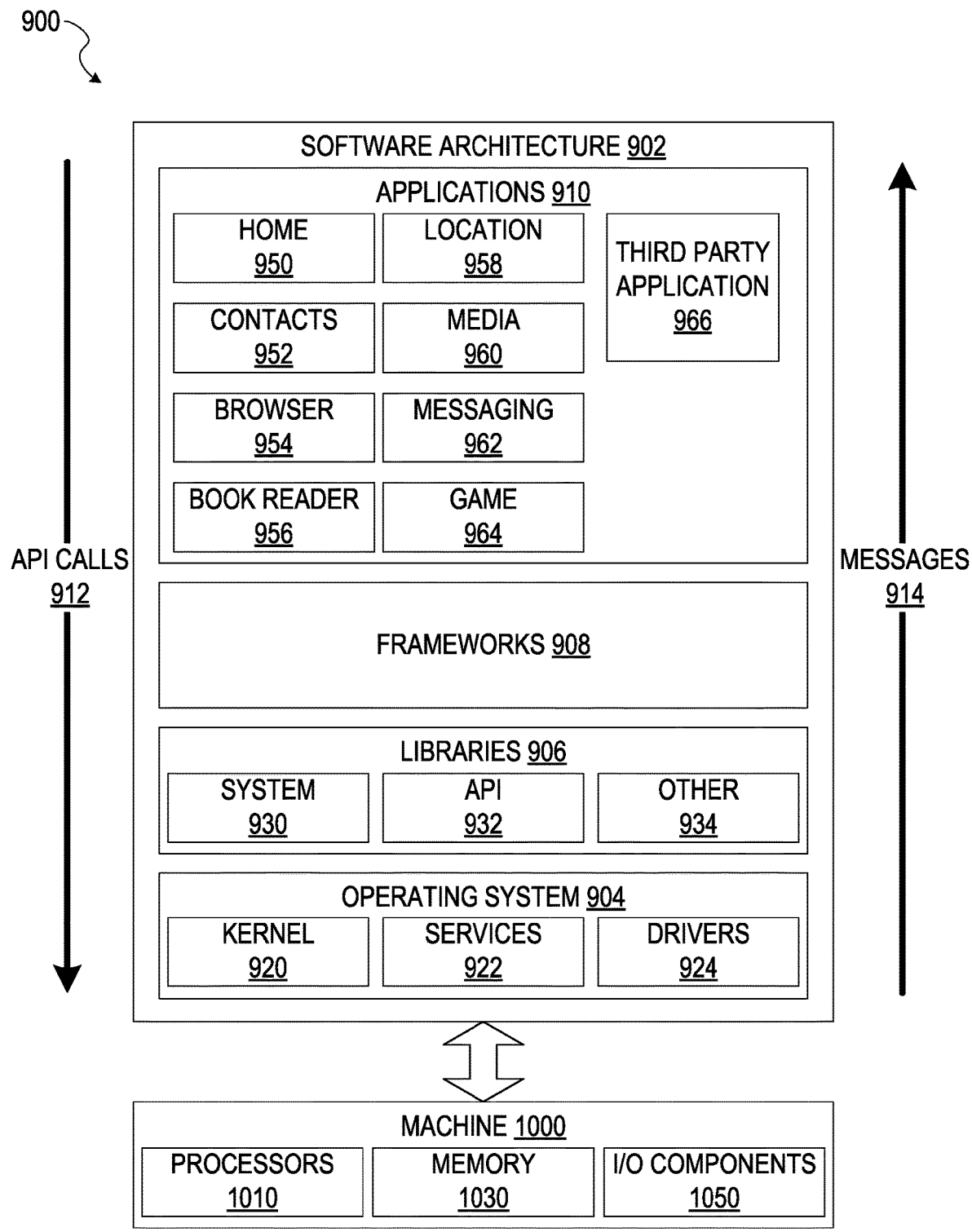
FIG. 9 is a block diagram illustrating an example of a software architecture that may be installed on a machine, according to some example embodiments.

FIG. 9 is a block diagram 900 illustrating a software architecture 902, which may be installed on any one or more of the devices described above. FIG. 9 is merely a non-limiting example of a software architecture, and it will be appreciated that many other architectures may be implemented to facilitate the functionality described herein. The software architecture 902 may be implemented by hardware such as a machine 1000 of FIG. 10 that includes processors 1010, memory 1030, and I/O components 1050. In this example, the software architecture 902 may be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, according to some implementations.

In various implementations, the operating system 904 manages hardware resources and provides common services. The operating system 904 includes, for example, a kernel 920, services 922, and drivers 924. The kernel 920 acts as an abstraction layer between the hardware and the other software layers in some implementations. For example, the kernel 920 provides memory management, processor management (e.g., scheduling), component management, networking, and security settings, among other functionality. The services 922 may provide other common services for the other software layers. The drivers 924 may be responsible for controlling or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 906 provide a low-level common infrastructure that may be utilized by the applications 910. The libraries 906 may include system libraries 930 (e.g., C standard library) that may provide functions such as memory allocation functions, string manipulation functions, mathematic functions, and the like. In addition, the libraries 906 may include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include a wide variety of other libraries 934 to provide many other APIs to the applications 910.

The frameworks 908 provide a high-level common infrastructure that may be utilized by the applications 910, according to some implementations. For example, the frameworks 908 provide various graphic user interface (GUI) functions, high-level resource management, high-level location services, and so forth. The frameworks 908 may provide a broad spectrum of other APIs that may be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages may be employed to create one or more of the applications 910, structured in a variety of manners, such as object-orientated programming languages (e.g., Objective-C, Java, or C++) or procedural programming languages (e.g., C or assembly language). In a specific example, the third-party application 966 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 966 may invoke the API calls 912 provided by the mobile operating system (e.g., the operating system 904) to facilitate functionality described herein.

Example Machine Architecture and Machine-Readable Medium

Figure 10:
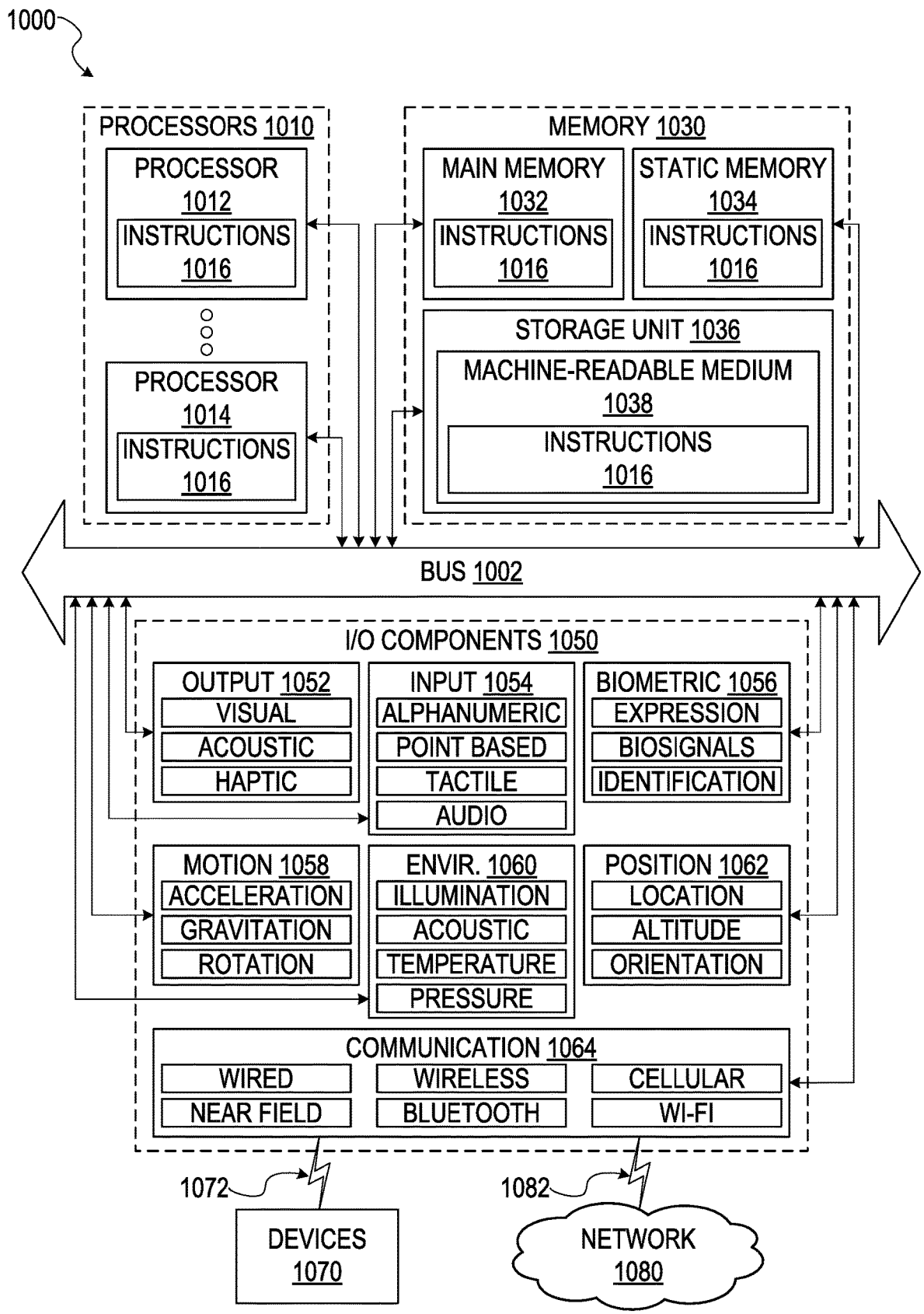
FIG. 10 is a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (also referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036 accessible to the processors 1010 via the bus 1002. The storage unit 1036 may include a machine-readable medium 1038 on which are stored the instructions 1016 embodying any one or more of the methodologies or functions described herein. The instructions 1016 may also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various implementations, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, in some implementations, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 as "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a memory that stores instructions; and
one or more processors configured by the instructions to perform operations comprising:
accessing, from a first service provider system, via a network, a set of account identifiers for a set of accounts that the first service provider system provides a first service to, the set of account identifiers comprising a first account identifier;
receiving, from a client device associated with the first account identifier, authorization to provide a second service for the first account identifier;
based on the authorization to provide the second service for the first account identifier:
providing the second service for the first account identifier; and
based on the accessing of the first account identifier from the first service provider system, crediting an account corresponding to the first service provider system.

2. The system of claim 1, wherein the operations further comprise:
receiving, from the client device, information for a financial account associated with the first account identifier; and
debiting, from the financial account, a fee associated with the service.

3. The system of claim 1, wherein the service for the first account identifier is a dark web search for the first account identifier.

4. The system of claim 1, wherein the service for the first account identifier is an identity security service.

5. The system of claim 1, wherein the service for the first account identifier is a privacy security service.

6. The system of claim 1, wherein the first account identifier is an email address.

7. The system of claim 1, wherein the first account identifier is a password.

8. The system of claim 1, wherein the operations further comprise:
periodically receiving, from the first service provider system and via the network, updates to the set of account identifiers.

9. The system of claim 1, wherein the providing of the service for the first account identifier comprises periodically providing the service.

10. The system of claim 1, wherein the providing of the service for the first account identifier comprises waiving a fee for the service.

11. The system of claim 1, wherein the first service provider system is a social media service provider system.

12. The system of claim 1, wherein the crediting of the account comprises transmitting a transfer request, via the network, to a banking server.

13. A non-transitory machine-readable medium that stores instructions that, when executed by one or more processors, cause the one or more processors to perform operations comprising:
accessing, from a first service provider system, via a network, a set of account identifiers for a set of accounts that the first service provider system provides a first service to, the set of account identifiers comprising a first account identifier;
receiving, from a client device associated with the first account identifier, authorization to provide a second service for the first account identifier;
based on the authorization to provide the second service for the first account identifier:
providing the second service for the first account identifier; and
based on the accessing of the first account identifier from the first service provider system, crediting an account corresponding to the first service provider system.

14. The non-transitory machine-readable medium of claim 13, wherein the operations further comprise:
receiving, from the client device, information for a financial account associated with the first account identifier; and
debiting, from the financial account, a fee associated with the service.

15. The non-transitory machine-readable medium of claim 13, wherein the service for the first account identifier is a dark web search for the first account identifier.

16. The non-transitory machine-readable medium of claim 13, wherein the service for the first account identifier is an identity security service.

17. The non-transitory machine-readable medium of claim 13, wherein the service for the first account identifier is a privacy security service.

18. A method comprising:
accessing, by a second service provider system and from a first service provider system, via a network, a set of account identifiers for a set of accounts that the first service provider system provides a first service to, the set of account identifiers comprising a first account identifier;
receiving, from a client device associated with the first account identifier, authorization to provide a second service for the first account identifier;

based on the authorization to provide the second service for the first account identifier:
  providing, by the second service provider system, the second service for the first account identifier; and
  based on the accessing of the first account identifier from the first service provider system, crediting an account corresponding to the first service provider system.

19. The method of claim 18, wherein the first account identifier is an email address.

20. The method of claim 18, wherein the first account identifier is a password.

* * * * *